(12) United States Patent
Pinheiro Martins et al.

(10) Patent No.: US 11,848,562 B2
(45) Date of Patent: Dec. 19, 2023

(54) ELECTRIC VEHICLE CHARGING STATION FOR CONNECTING TO HIGH OR EXTRA HIGH VOLTAGE TRANSMISSION LINE AND OPERATION METHOD THEREOF

(71) Applicant: REN SERVIÇOS S A, Lisbon (PT)

(72) Inventors: Jorge Filipe Pinheiro Martins, Lisbon (PT); André Quaresma Dos Santos, Lisbon (PT); Pedro Carola, Lisbon (PT)

(73) Assignee: REN SERVIÇOS S A, Lisbon (PT)

( * ) Notice: Subject to any disclaimer, the term of this patent is extended or adjusted under 35 U.S.C. 154(b) by 317 days.

(21) Appl. No.: 16/969,090

(22) PCT Filed: Dec. 21, 2018

(86) PCT No.: PCT/IB2018/060533
§ 371 (c)(1),
(2) Date: Aug. 11, 2020

(87) PCT Pub. No.: WO2019/123424
PCT Pub. Date: Jun. 27, 2019

(65) Prior Publication Data
US 2021/0362613 A1  Nov. 25, 2021

(30) Foreign Application Priority Data
Dec. 22, 2017 (PT) .......................... 110466

(51) Int. Cl.
*H02J 5/00* (2016.01)
*B60L 53/30* (2019.01)
(Continued)

(52) U.S. Cl.
CPC ............... *H02J 5/00* (2013.01); *B60L 53/30* (2019.02); *H02G 7/00* (2013.01); *H02J 7/0042* (2013.01); *H02J 2310/48* (2020.01)

(58) Field of Classification Search
CPC .................................. B60L 53/30; H02G 7/00
(Continued)

(56) References Cited

U.S. PATENT DOCUMENTS

2011/0202418 A1* 8/2011 Kempton ........... G06Q 30/0601
705/26.1
2012/0019203 A1 1/2012 Kressner
(Continued)

FOREIGN PATENT DOCUMENTS

CN 206623692 U 11/2017

OTHER PUBLICATIONS

International Search Report for corresponding PCT Application No. PCT/IB2018/060533 dated Apr. 10, 2019 (3 pages).
(Continued)

*Primary Examiner* — Suchin Parihar
(74) *Attorney, Agent, or Firm* — Leason Ellis LLP (57) ABSTRACT

An electric vehicle charging station for connecting to a span of a high or extra high voltage transmission line, comprising: a tap for connecting to the span of the transmission line; a substation comprising one or more power voltage transformers; a plurality of electric vehicle chargers. The power voltage transformers are station service voltage transformers, auxiliary service voltage transformers, or power VTs. Said power voltage transformers may be star-delta transformers or star-star transformers. Said tap may comprises, for each phase of the transmission line: an insulator for linking a first and a second interrupted conductor points of an interrupted transmission line conductor; a drop conductor connected between the first interrupted conductor point and said substation; a shunt connector connected between the second interrupted conductor point and a point of the drop conductor or connected between the first and second interrupted conductor points.

17 Claims, 9 Drawing Sheets

(51) Int. Cl.
*H02G 7/00* (2006.01)
*H02J 7/00* (2006.01)

(58) Field of Classification Search
USPC .......................................................... 320/109
See application file for complete search history.

(56) References Cited

U.S. PATENT DOCUMENTS

| | | | |
|---|---|---|---|
| 2014/0159658 A1* | 6/2014 | Kiceniuk, Jr. .......... | B60L 53/14 320/155 |
| 2016/0233685 A1 | 8/2016 | Guo et al. | |
| 2017/0174090 A1 | 6/2017 | Lakamp et al. | |
| 2017/0246961 A1* | 8/2017 | Lee .......................... | B60L 53/63 |
| 2018/0162229 A1* | 6/2018 | Götz ...................... | H02J 7/0013 |
| 2018/0366978 A1* | 12/2018 | Matan ...................... | H02J 3/18 |
| 2019/0378648 A1* | 12/2019 | Pratt ....................... | H02P 13/06 |
| 2020/0055416 A1* | 2/2020 | Johansen .............. | B60L 53/305 |

OTHER PUBLICATIONS

Wikipedia, "Insulated-gate bipolar transistor." Wikipedia.org,, published prior to Aug. 11, 2020 (Retrieved from the Internet Sep. 7, 2023), 10 pages, Internet URL: <<https://en.wikipedia.org/w/index.phptitle=Insulatedgate_bipolar_transistor&oldid=1169041707>> (Year: 2020).

Nils Soltau, "High-Voltage IGBT Modules for High-Power High-Reliability Applications," published Nov. 30, 2021 (Retrieved from the Internet Sep. 7, 2023), 10 pages, Internet URL: <<https://eepower.com/technical-articles/high-voltage-igbt-modules-for-high-power-high-reliability-applications/>> (Year 2021).

Hengsi Qin et al., "Ac-Ac dual active bridge converter for solid state transformer," 2009 IEEE Energy Conversion Congress and Exposition, San Jose, CA, USA, Sep. 2009, pp. 3039-3044.

* cited by examiner

ELECTRIC VEHICLE CHARGING STATION FOR CONNECTING TO HIGH OR EXTRA HIGH VOLTAGE TRANSMISSION LINE AND OPERATION METHOD THEREOF

CROSS-REFERENCE TO RELATED APPLICATIONS

This application is a U.S. National Stage Application under 35 U.S.C. § 371 of International Patent Application No. PCT/IB2018/060533, filed Dec. 21, 2018, which claims priority to Portugal Patent Application No. 110466, filed Dec. 22, 2017, the contents of which are each hereby incorporated by reference in their respective entireties.

TECHNICAL FIELD

The present disclosure relates to a power supply electric vehicle charging station having a connection from high and extra high voltage networks.

BACKGROUND

The electrical vehicle charging station is a key infrastructure component for the transportation economy based on electrical energy.

The foreseen technical requirements of the charging stations include: large geographic coverage, enough power supply, economic efficiency, fast charging times and, high reliability and availability.

The installation of charging stations in large urban geographic areas has been solved by the available electrical distribution systems, with diminish additional investment. On the contrary, on rural and semi-urban geographic regions, the available electrical distribution system is weak or inexistent. The transmission network is present in these areas, where the transmission lines cross several roads and highways in numerous locations.

Normally, upsizing the local low voltage network to receive a electrical vehicle charging station has a domino effect that initiates a succession of similar upsizing of upstream network levels, in particular at the medium voltage level.

For example, document US 2017/0174090 A1 describes a utility tower for energy generation, management and distribution, the utility tower comprising: a vertical structure comprising: at least one energy storage, a communication network to communicate power requirements, power quality, power available or any combination thereof; a power source coupled to the at least one energy storage, a controller to calculate at least one power distribution criterion and to control the energy transfer from the at least one energy storage to one or more loads based on the at least one power distribution criterion. Optionally, the power source may be a renewable energy source or an electric grid. The disclosure of US 2017/0174090 A1 has the mentioned disadvantages.

These facts are disclosed in order to illustrate the technical problem addressed by the present disclosure.

GENERAL DESCRIPTION

The present disclosure relates to a power supply electric vehicle charging station having a connection from high and extra high voltage networks, in particular 60 kV to 800 kV networks, further in particular 72.5 kV to 400 kV networks.

The disclosed electric vehicle charging station for connecting to high or extra high voltage transmission line is able to directly power supply electric vehicle charging stations from extra high voltage networks and high voltage networks by tapping on the line span the three phases of the transmission lines to three-phase power transformers with suitable voltage ratio, avoiding in between the need for a distribution network, in particular avoiding a medium voltage stage, for example 1 kV to 69 kV networks, used for distribution in urban and rural areas.

By direct feeding the vehicle charging station from the extra high voltage network, the available power to the station is only limited by the installed nominal power of the power transformers and by the short-circuit power at the transmission line tap.

The system, according to an embodiment, is arranged into three main parts combined according to the power flow: (1) the charging station tap (CST); (2) the charging station substation (CSS) and; (3) the Charging station park (CSP).

The charging station tap CST, according to an embodiment, includes all high voltage equipment and protection and automation equipment required to safely connect the power transformers to the transmission line and to integrate the high power electric vehicle charging station load into the transmission system. Additionally, according to an embodiment, it includes the communication links and equipment used to remotely operate and monitor the high power electric vehicle charging station.

The charging station substation CSS, according to an embodiment, includes all power transformers that are part of the high voltage electric vehicle charging station and the several low voltage feeders that will power supply the electric vehicle charging stations. The charging station substation, according to an embodiment, also includes the transformers protection, the low voltage feeder's protection, automation equipment, metering equipment and, the low voltage auxiliary power supply system. Additionally, according to an embodiment, it includes the local area communication network equipment and communication links. It provides remote communication access to electric vehicle charging stations.

The charging station park CSP, according to an embodiment, includes the electric vehicle charging station loads (CS) connected to the low voltage feeders provided by the CSS. The CS, according to an embodiment, are series connected to each feeder and its number is limited by the feeder maximum power.

It is disclosed an electric vehicle charging station for connecting to a span of a high or extra high voltage transmission line, comprising:
a tap for connecting to the span of the transmission line;
a substation fed from said tap comprising one or more power voltage transformers for transforming the high or extra high voltage to a low voltage for feeding electric vehicle chargers;
a plurality of electric vehicle chargers fed from said substation.

A power voltage transformer, or also referred to as an ASVT, auxiliary services voltage transformer, is an intermediate transformer between a power transformer and a voltage transformer, able to supply at least several kVA at low voltage receiving power directly from a high voltage transmission line, thus enabling the bypass of medium voltage network distribution.

This kind of transformers combines the voltage ratio and insulation features of a voltage transformer with the power features of a power transformer. They are currently used to provide power to remote substations or, occasionally, remote villages, but are not normally used to power other kinds of loads or have usual application outside these specific situations.

Examples of power voltage transformers (power VTs) are ABB TIP, in particular for 72.5-550 kV; ARTECHE UG, in particular for 72.5 a 550 kV; SIEMENS-TRENCH PSVS, in particular for 123 a 550 kV.

In an embodiment, the one or more power voltage transformers are station service voltage transformers, auxiliary service voltage transformers, or power VTs.

In an embodiment, said power voltage transformers comprise a three-phase star-delta power voltage transformers or a three-phase star-star power voltage transformers.

In an embodiment, said power voltage transformers comprise set of three one-phase power voltage transformers connected as star-delta or a set of three one-phase power voltage transformers connected as star-star.

In an embodiment, said tap comprises, for each phase of the transmission line:
  an insulator for linking a first and a second interrupted conductor points of an interrupted transmission line conductor;
  a drop conductor connected between the first interrupted conductor point and said substation;
  a shunt connector connected between the second interrupted conductor point and a point of the drop conductor or connected between the first and second interrupted conductor points.

In an embodiment, said tap is arranged such that, by overhead power line maintenance operation, the substation-connected drop conductor is switchable:
  from being connected with the first interrupted conductor point,
  to being connected with the second interrupted conductor point,
  and vice-versa.

In an embodiment, said tap is arranged such that, by overhead power line maintenance operation, the shunt conductor is switchable:
  from being connected between the second interrupted conductor point and a point of the drop conductor,
  to being connected between the first and second interrupted conductor points, or
  to being disconnected and removed from said tap.

In an embodiment, said tap comprises, for each phase of the transmission line:
  an insulator for linking a first and a second interrupted conductor points of an interrupted transmission line conductor;
  a drop conductor connected between the first interrupted conductor point and said substation;
  a shunt connector arranged such that, when connected, the interrupted parts of the transmission line conductor are connected between each other, and, when disconnected or removed, the interrupted parts of the transmission line conductor are disconnected between each other.

An embodiment comprises a line disconnect switch between the transmission line and the tap, for connecting and disconnecting the substation from the high or extra high voltage transmission line when required, independently of the transmission line being energised or not.

A line disconnect switch, or high-voltage disconnector is an off-load circuit disconnecting equipment that has a very low current-interruption capability, normally not being used for normal control of the circuit but for changing the network layout, for example, for maintenance or service purposes. In particular, a line disconnect switch normally lacks an electrical arc suppression mechanism and is intended to be used only after the network has been de-energised.

However, we have found that the stored magnetic energy in the voltage power transformer can be sufficiently low so that a line disconnect switch may have enough breaking and making capacity to interrupt and to establish the voltage power transformer ferromagnetic core current without the need of a circuit breaker.

An embodiment comprises a motorized earthing switch for securely earthing the charging station when it is electrically disconnected from the transmission line.

An embodiment comprises a current transformer for measuring the fault current in case of short-circuit in the high or extra high voltage part of the charging station.

An embodiment comprises an optical link interruption device for mounting in a transmission line tower adjacent to the tap span of the transmission line, wherein said device comprises a data communication optical link for linking the charging station and both ends of an interrupted optical link.

In an embodiment, the interrupted optical link is embedded within an earth conductor of the transmission line.

An embodiment comprises a local area communication network for data linking the charging station equipment.

An embodiment comprises protection equipment for protecting the charging station from electrical faults, protection equipment for protecting the transmission line from electrical faults of the charging station, and/or protection equipment for protecting the electric vehicle chargers from electrical faults.

An embodiment comprises data communication links for monitoring and operating remotely the charging station.

BRIEF DESCRIPTION OF THE DRAWINGS

The following figures provide preferred embodiments for illustrating the description and should not be seen as limiting the scope of the invention.

DETAILED DESCRIPTION

The system, according to an embodiment, is arranged into three main parts combined according to the power flow: (1) the charging station tap (CST); (2) the charging station substation (CSS) and; (3) the Charging station park (CSP).

The charging station tap CST preferably includes all high voltage equipment and protection and automation equipment required to safely connect the power transformers to the transmission line and to integrate the high power electric vehicle charging station load into the transmission system. Additionally, it preferably includes the communication links and equipment used to remotely operate and monitor the high power electric vehicle charging station.

The charging station substation CSS preferably includes all power transformers that are part of the high voltage electric vehicle charging station and the several low voltage feeders that will power supply the electric vehicle charging stations. The charging station substation also preferably includes the transformers protection, the low voltage feeder's protection, automation equipment, metering equipment and, the low voltage auxiliary power supply system. Additionally, it preferably includes the local area communication network equipment and communication links. It preferably provides remote communication access to electric vehicle charging stations.

The charging station park CSP includes the electric vehicle charging station loads (CS) connected to the low voltage feeders provided by the CSS. The CS are preferably series connected to each feeder and its number is limited by the feeder maximum power.

Figure 2:
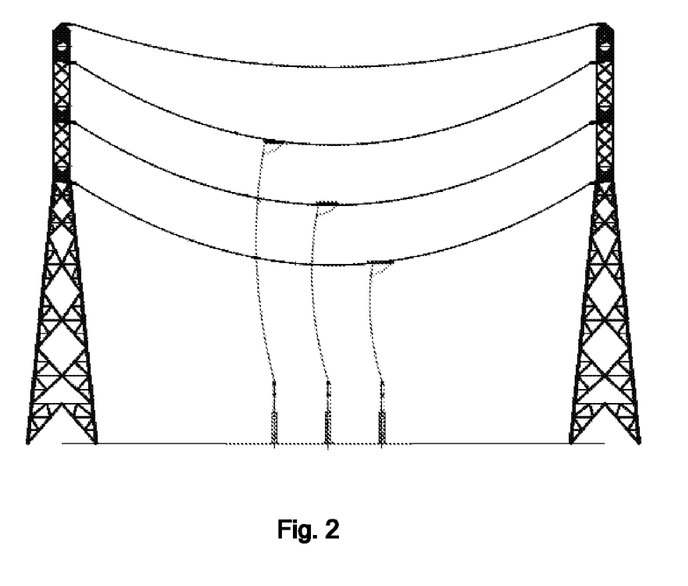
FIG. 2: Schematic representation of an embodiment of the charging station tap of the disclosed electric vehicle charging station.
Figure 3:
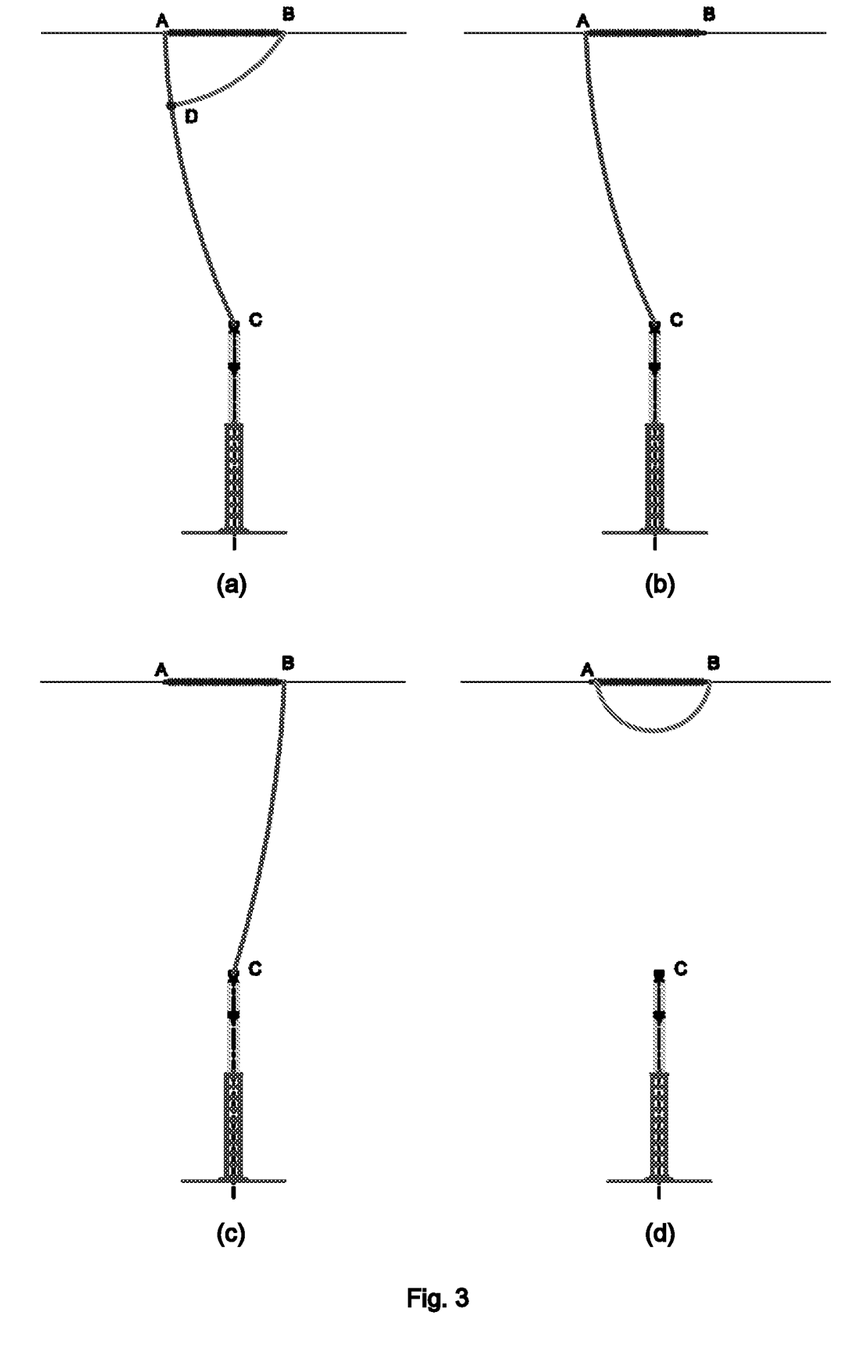
FIG. 3: Schematic representation of an embodiment of the charging station tap interrupted conductor point connections of the disclosed electric vehicle charging station.

The CST is placed at some point in the transmission line span. At this location, an insulation string, connected in between points A and B, interrupts the phase conductors. The insulation string length is defined according to the Basic Insulation Level of the transmission line. A conductor is attached to point A and the first insulation column of the high power electric charging station at point C. The power supply of the high power electric vehicle charging station is made through this conductor. The shunt conductor between point B and D guarantees the transmission line electric continuity.

This tap arrangement allows making maintenance to the transmission line without placing the high power electric vehicle charging station out of service. The maintenance can be made by removing the conductor connecting point B and D. In case the maintenance is made to the transmission line to the right side of point B, the high power electric vehicle charging station is feed by the transmission line located left to point A by maintaining the connection between point A to C. In case the maintenance is made to the transmission line to the left side of point A, the conductor connecting point A and C is detached from point A and attached to point B.

Preparing the transmission line for tapping can be made prior to the high power electric vehicle charging station construction by installing the insulation string and connecting point A to B. The tap circuit is preferably connected to the high power electric vehicle charging station through a motorized line disconnecting switch LDS that is used to electrically isolate the station from the transmission line.

Figure 4:
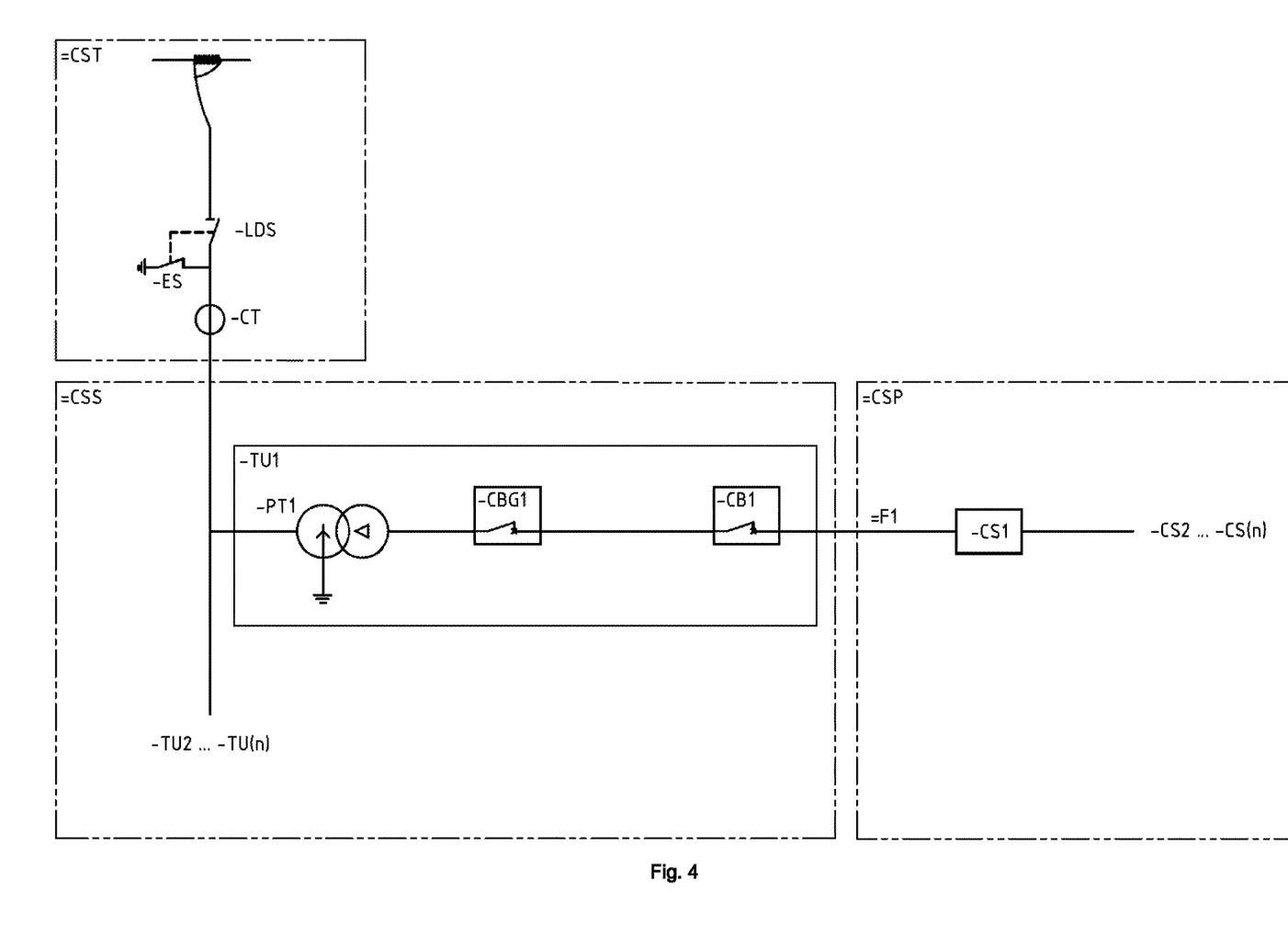
FIG. 4: Schematic representation of an electrical layout according to a first embodiment of the charging station tap.

A motorized earthing switch ES is preferably installed close to the LDS to securely earth the station when it is electrically disconnected from the transmission line. In case of maintenance of the LDS, the connection of points A and B ensures the continuity of the operation of the overhead line, during the shutdown of the charging station.

The optical link available in the transmission line ground wire is preferably interrupted at one of the transmission line adjacent towers to the tap point, and it is installed an optical junction box JB at this location. A communication optical link between the high power electric vehicle charging station and each of the transmission line end substations is preferably established at this location. An optical fiber cable is preferably installed connecting the communication switch SWG located in the high power electric vehicle charging station and the junction box. All communications to the high power electric vehicle charging station are preferably made through this switch and link.

Figure 7:
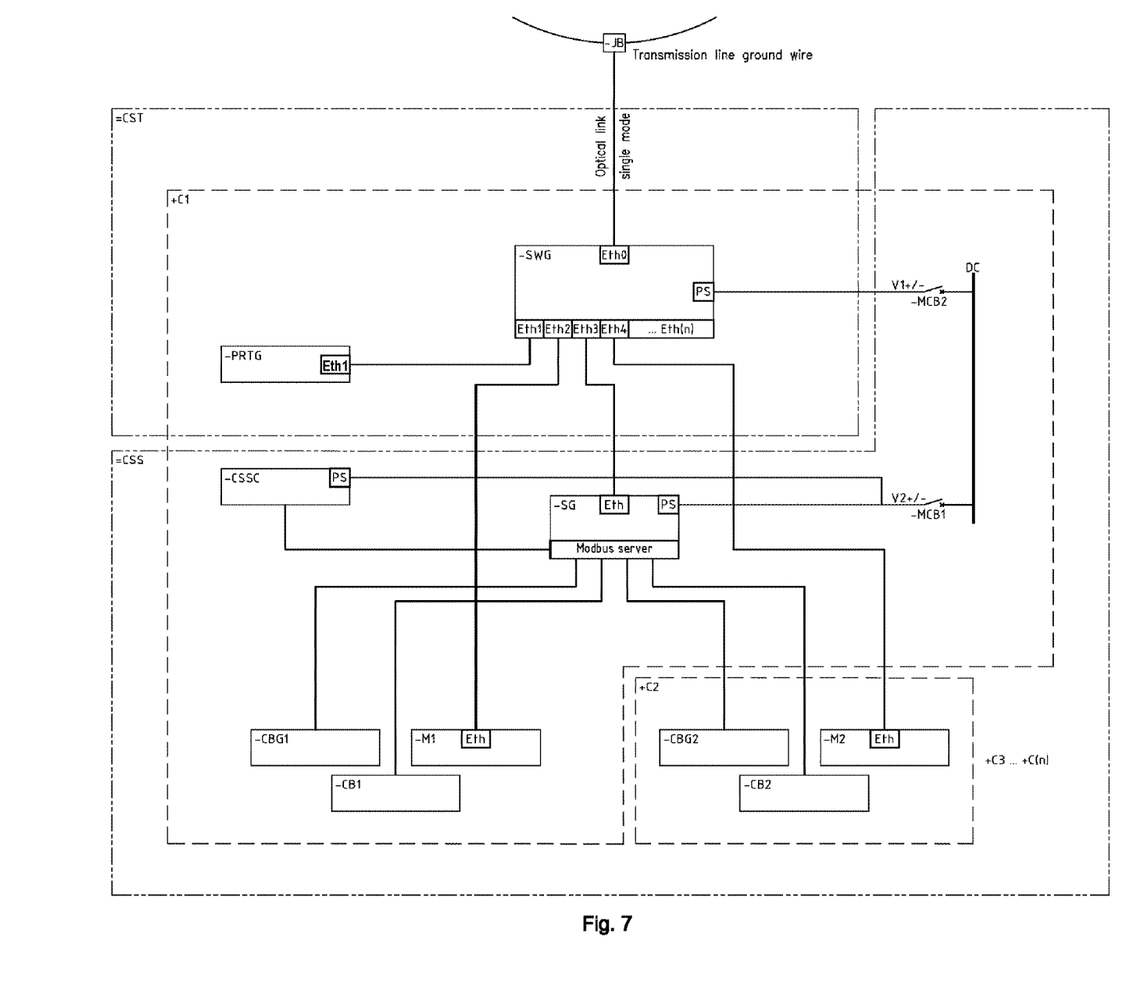
FIG. 7: Schematic representation of the layout of the data communication circuits using Modbus Communication and according to a first embodiment of the charging station tap.
Figure 8:
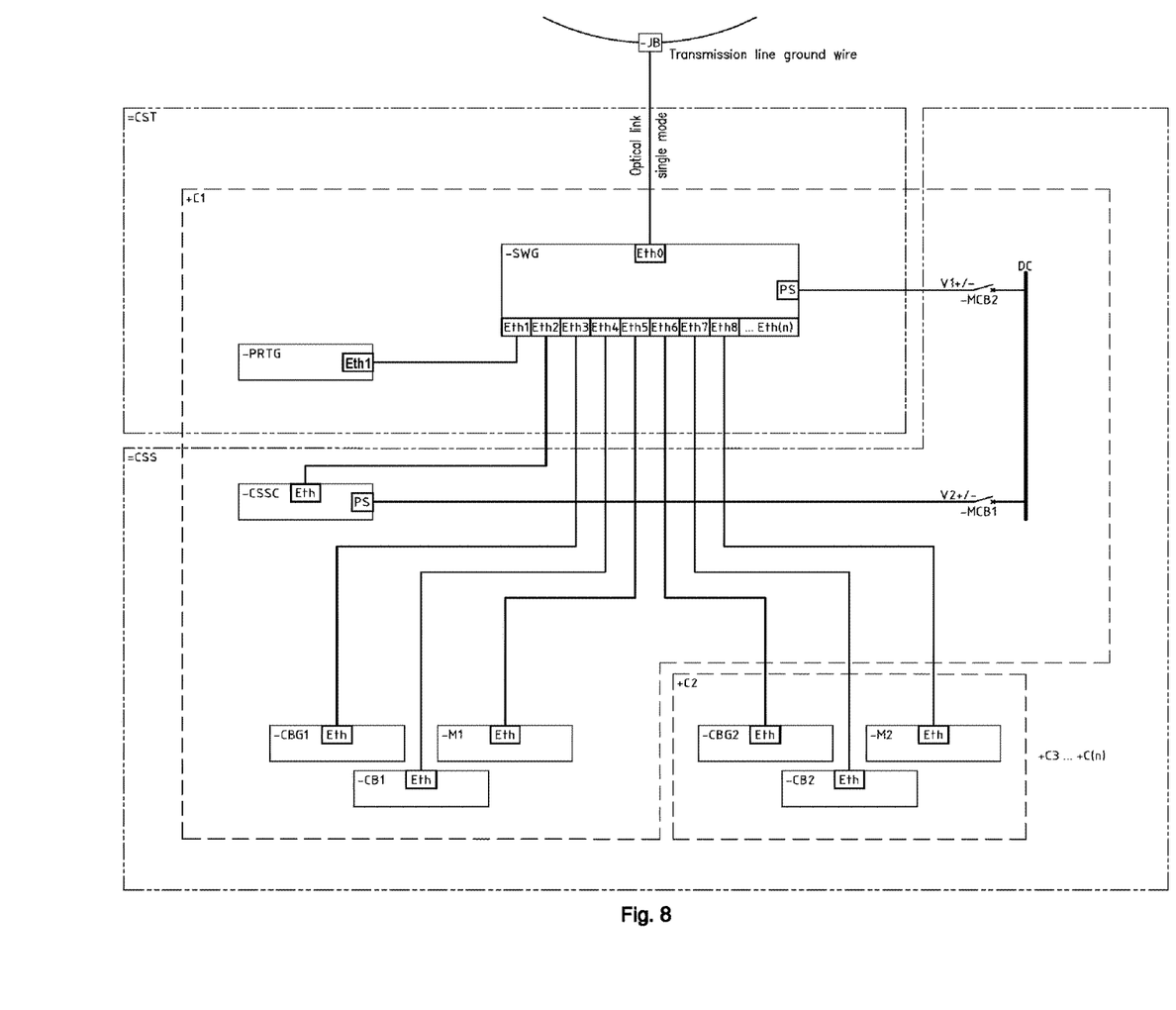
FIG. 8: Schematic representation of the layout of data communication circuits using Ethernet Communication and according to a first embodiment of the charging station tap.

The communication switch SWG is preferably used to aggregate the Ethernet communication required for remote access and operation of the high power electric vehicle charging station.

A current transformer CT is preferably installed immediately after the ES to measure the fault current in case a short-circuit occurs in the EHV circuit of CSS or eventually in the power transformers' primary winding. In case the operation principle of the CT is the Faraday Effect, a Merging Unit device is preferably used to provide the protection and automation device PRTG the real-time measurement value according to the IEC 61869-9 standard.

Figure 6:
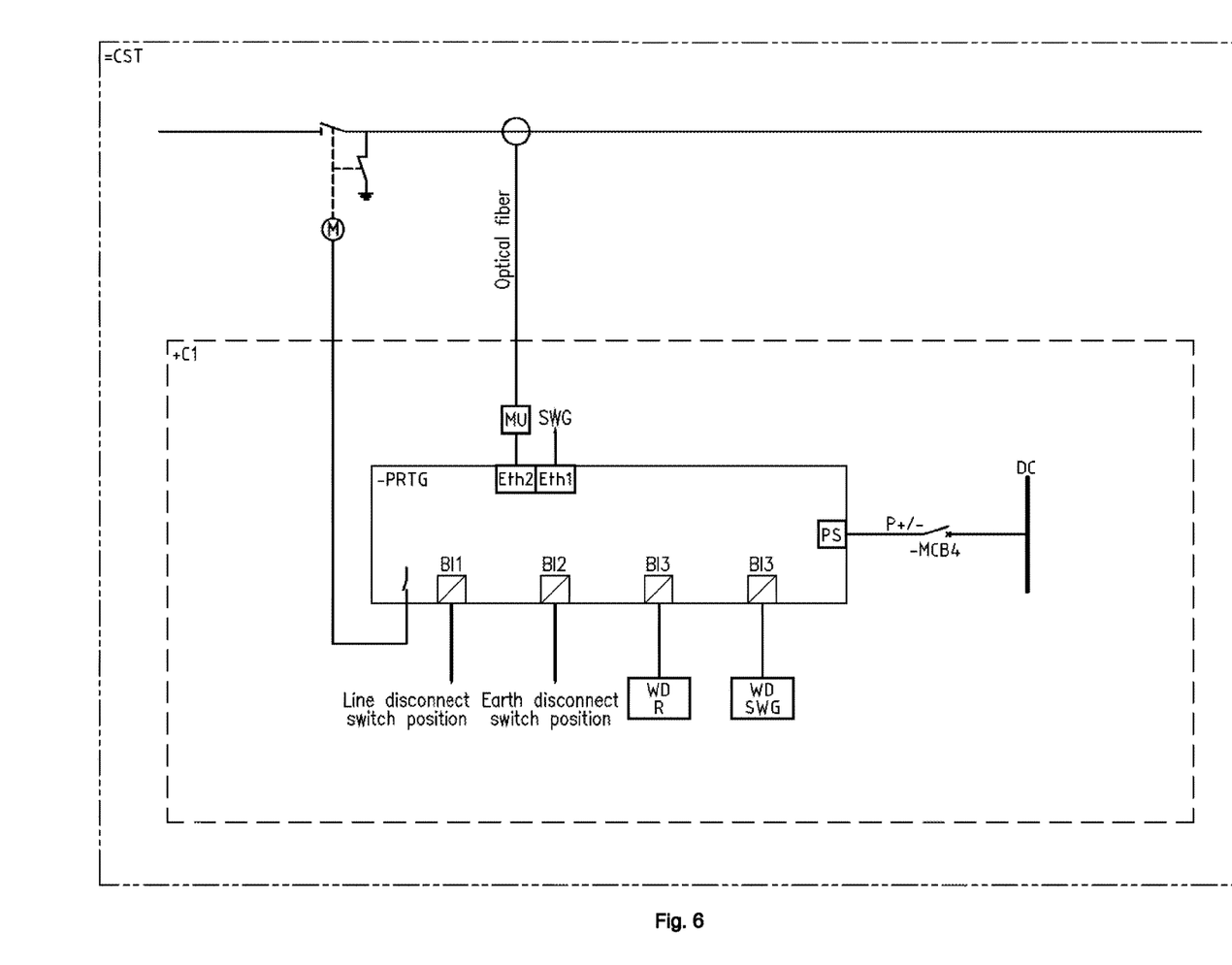
FIG. 6: Schematic representation of the electrical layout of the high voltage protection and automation according to a first embodiment of the charging station tap.

The protection and automation device PRTG is preferably installed in the CST and used for the following purposes:
  to remotely open or close the motorized line and earth disconnect switches;
  to monitor and supervise the line and earth disconnect switch positions and transmit this information to the transmission line end substations;
  to detect a short-circuit in the EHV circuit of CSS or eventually in the power transformers' primary winding, using an overcurrent protection that compares the magnitude of the measured current, with a predefined threshold value. In case of a positive detection, it sends and an autorecloser inhibit command to the transmission line end substations and also blocks the transmission line manual energization;
  to supervise the auxiliary power supply status WD Ret.

The protection and automation device PRTG is preferably directly connected through an Ethernet link to the communication switch SWG.

One or more high power electric vehicle charging stations can be tapped to the same transmission line, by properly integrating its operation in the operation of the transmission line.

The high power electric vehicle charging station is preferably placed in service with prior confirmation of the network operator. To preferably place in service the station, both high voltage circuit breakers from the corresponding transmission line bays must be in open position, then the earthing switch ES is firstly opened and secondly the line disconnecting switch LDS is closed.

The high power electric vehicle charging station is placed out of service with prior information to the network operator. To place out of service the station, both high voltage circuit breakers from the transmission line bays must be opened, then the line disconnecting switch LDS is firstly open and secondly the earthing switch ES is close. After these operations, the line can be energized by closing of the high voltage circuit breakers from the transmission line bays.

The operation of the transmission line autoreclose functions at all line ends is preferably conditioned to a permit signal, being permanently sent by the PRTG in all high power electric vehicle charging stations taped to the transmission line. In the absence of at least one these signals, the autoreclose functions are preferably inhibited and no line circuit breaker close command is made after a transmission line fault. The permit signal is preferably suppressed in case the PRTG overcurrent protection operates. The signal is preferably suppressed until it is acknowledged in the tapped high power electric vehicle charging station where the operated PRTG is installed.

Transmission line energization is preferably made with confirmation, from all tapped high power electric vehicle charging stations, that either their line disconnect switch is open, or if closed, receiving from the PRTG the autoreclose permit signal and a supervision signal stating that the device is healthy and in operation.

A first embodiment of the charging station substation includes more than one transformation unit TU. Each unit consists of a power transformer, a low voltage feeder, high power low voltage circuit breakers, protection, automation, and metering equipment.

The winding group of the transformation unit is preferably Yd to minimise the short-circuit current magnitude in a phase to ground fault. Additionally, it blocks all zero sequence harmonics of voltage and current, i.e. $3^{rd}$, $6^{th}$, $9^{th}$, etc. that flow from the low voltage to the EHV networks and vice versa.

Alternatively, the winding group of the transformation unit is preferably Yyn for systems that require a neutral connection in the low voltage circuit.

The high power low voltage circuit breaker CBGi, being i the transformation unit number, is the main protection device of the low voltage circuit. This includes time delay and instantaneous overcurrent protection functions and overvoltage protection function. Remote operation of the CBGi is also possible by means of serial or Ethernet communication, depending on the protocol used.

In case the low voltage circuit breaker CBGi uses a serial communication protocol, it connects to the server gateway SG to facilitate the serial communication to the Ethernet communication provided by the communication switch SWG. Otherwise, the low voltage circuit breaker CBGi directly connects to the communication switch SWG.

A metering device Mi measures all consumed load connected to bus Bi. This includes the feeder Fi load and the auxiliary power supply load ASPi. Being i the transformation unit number.

The metering device Mi are directly connected through an Ethernet link to the communication switch SWG.

The high power low voltage circuit breaker CBi, being i the transformation unit number, is the dedicated circuit breaker of feeder i. The feeder supplies a set of charging stations located in the charging station park. This includes time delay and instantaneous overcurrent protection functions. Remote operation of CBi is also possible by means of serial or Ethernet communication, depending on the protocol used.

In case the low voltage circuit breaker CBi uses a serial communication protocol, it connects to the server gateway SG to facilitate the serial communication to the Ethernet communication provided by the communication switch SWG. Otherwise, the low voltage circuit breaker CBi directly connects to the communication switch SWG.

The management of the low voltage circuit breakers CBGi and CBi is made by the contololler CSSC. Remote access and operation of the contololler CSSC is possible by means of serial or Ethernet communication, depending on the protocol used.

In case the controller CSSC uses a serial communication protocol, it connects to the server gateway SG to facilitate the serial communication to the Ethernet communication provided by the communication switch SWG. Otherwise, the low voltage circuit breaker CBi directly connects to the communication switch SWG and the CSSC directly connects to the communication switch SWG.

The auxiliary power supply unit ASPU includes an AC/DC converter R and the corresponding DC battery BAT, to provide DC power to all protection, automation and metering devices installed in the high power electric vehicle charging station. The input bus BAC connects to all transformation units busses Bi by the circuits APSi. In normal operation, only one APSi circuit is connected to bus BAC, and all the others are open. In case this circuit becomes unavailable, bus BAC will be power supplied by one of the other available ASPi. The output bus BDC provides DC voltage, protected by dedicated mini circuit breakers MCBj, being j the circuit number, to the following needs:

Communication switch power supply V1+/−
Controller CSSC and server gateway power supply V2+/−
Protection and automation device PRTG power supply P+/−
Line and earth disconnect switch mechanical power supply C+/−

Figure 5:
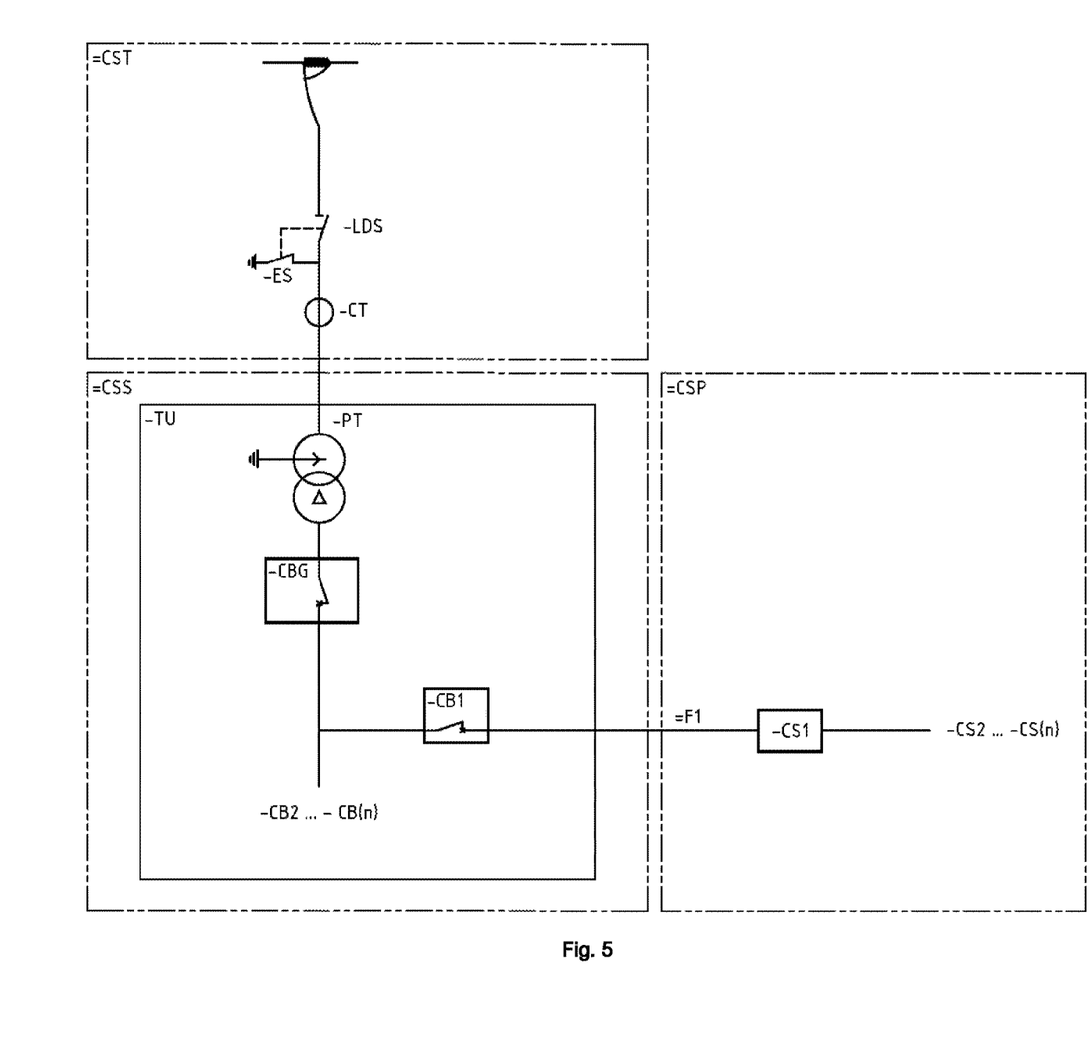
FIG. 5: Schematic representation of the electrical layout according to a second embodiment of the charging station tap.

A second embodiment of the charging station substation includes one transformation unit TU, including a power transformer, a low voltage feeder, high power low voltage circuit breakers, protection, automation, and metering equipment.

The winding group of the transformation unit is preferably Yd to minimise the short-circuit current magnitude in a phase to ground fault. Additionally, it blocks all zero sequence harmonics of voltage and current, i.e. $3^{rd}$, $6^{th}$, $9^{th}$, etc. that flow from the low voltage to the EHV networks and vice versa.

The high power low voltage circuit breaker CBG is the main protection device of the low voltage circuit. This includes time delay and instantaneous overcurrent protection functions and overvoltage protection function. Remote operation of the CBG is also possible by means of serial or Ethernet communication, depending on the protocol used.

Figure 9:
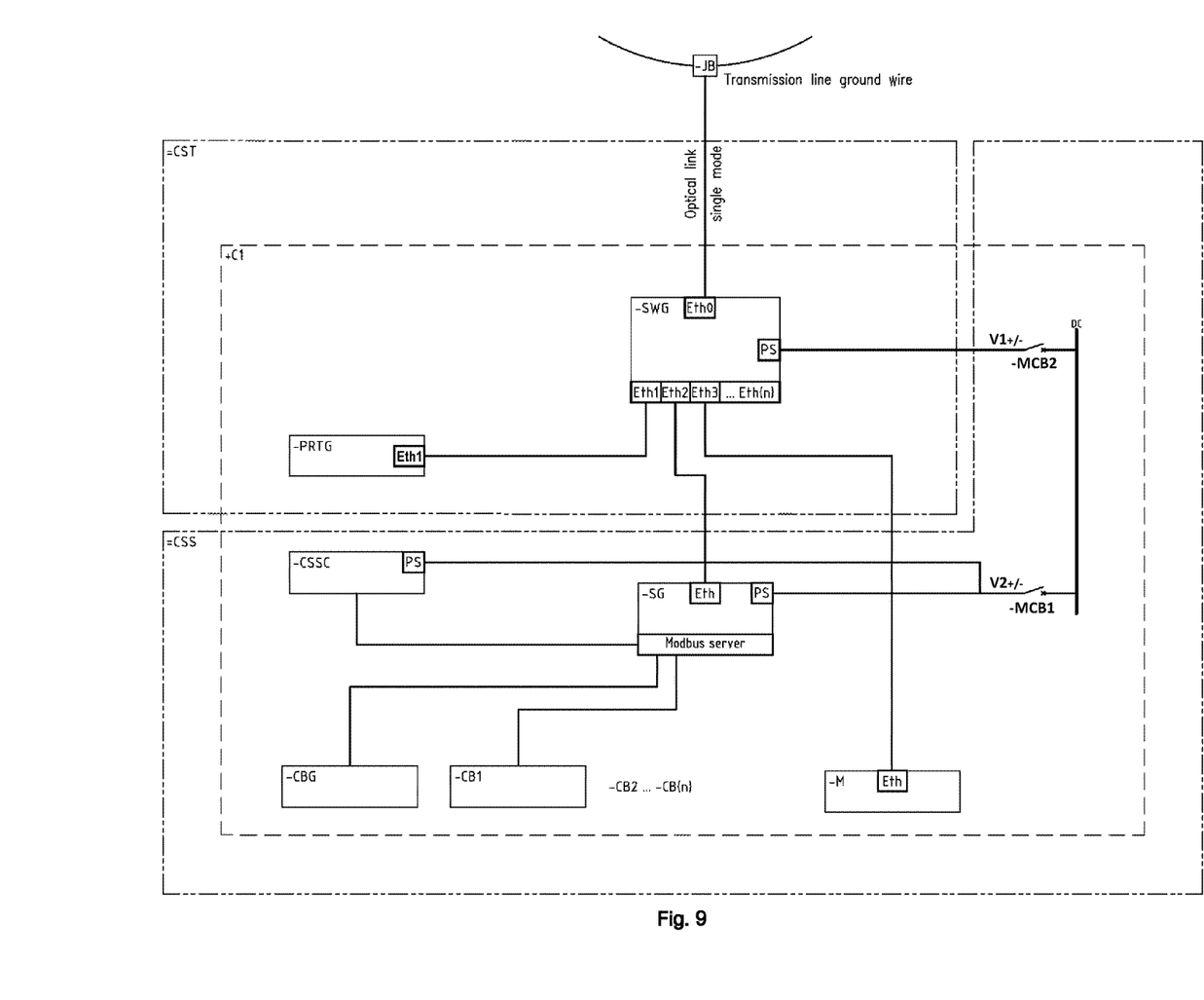
FIG. 9: Schematic representation of the layout of data communication circuits using Modbus Communication and according to a second embodiment of the charging station tap.
Figure 10:
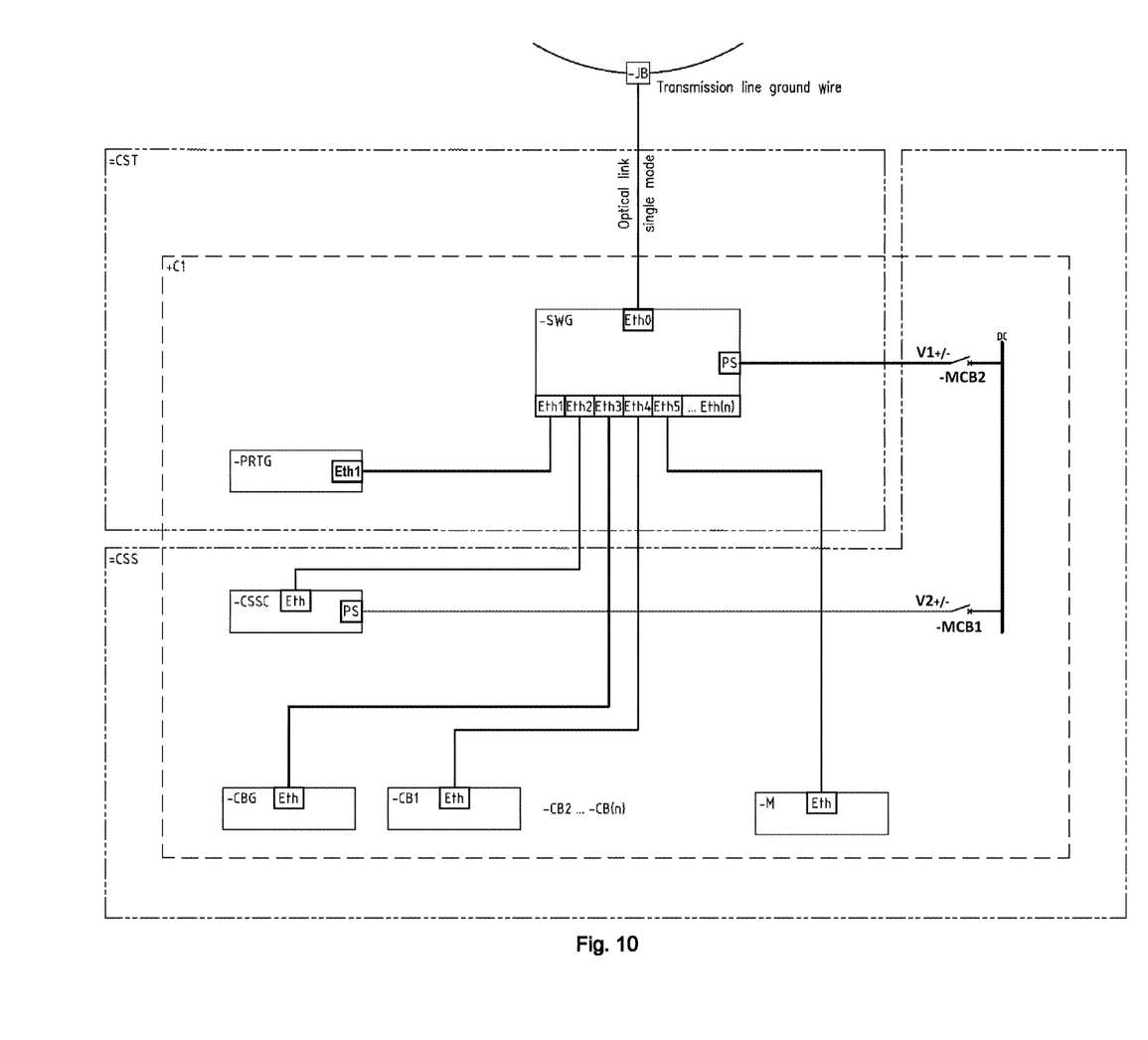
FIG. 10: Schematic representation of the layout of the data communication circuits using Ethernet Communication and according to a second embodiment of the charging station tap.

In case the low voltage circuit breaker CBG uses a serial communication protocol, it connects to the server gateway SG to facilitate the serial communication to the Ethernet communication provided by the communication switch SWG. Otherwise, the low voltage circuit breaker CBG directly connects to the communication switch SWG.

A metering device M measures all consumed load connected to bus B. This includes the feeders Fi load, being i the feeder number, and the auxiliary power supply load ASP.

The metering device M is directly connected through an Ethernet link to the communication switch SWG.

The high power low voltage circuit breaker CBi, being i the feeder number, is the dedicated circuit breaker of feeder i. The feeder supplies a set of charging stations located in the charging station park. This includes time delay and instantaneous overcurrent protection functions. Remote operation of CBi is also possible by means of serial or Ethernet communication, depending on the protocol used.

In case the low voltage circuit breaker CBi uses a serial communication protocol, it connects to the server gateway SG to facilitate the serial communication to the Ethernet communication provided by the communication switch SWG. Otherwise, the low voltage circuit breaker CBi directly connects to the communication switch SWG.

The management of the low voltage circuit breakers CBGi and CBi is made by the contololler CSSC. Remote access and operation of the controller CSSC is possible by means of serial or Ethernet communication, depending on the protocol used.

In case the controller CSSC uses a serial communication protocol, it connects to the server gateway SG to facilitate the serial communication to the Ethernet communication provided by the communication switch SWG. Otherwise, the low voltage circuit breaker CBi directly connects to the communication switch SWG and the CSSC directly connects to the communication switch SWG.

The auxiliary power supply unit APSU includes an AC/DC converter R and the corresponding DC battery BAT, to provide DC power supply to all protection, automation and metering devices installed in the high power electric vehicle charging station. The output bus BDC provides DC voltage, protected by dedicated mini circuit breakers MCBj, being j the circuit number, to the following needs:

Communication switch power supply V1+/−
Controller CSSC and server gateway power supply V2+/−
Protection and automation device PRTG power supply P+/−
Line and earth disconnect switch mechanical power supply C+/−

Figure 1:
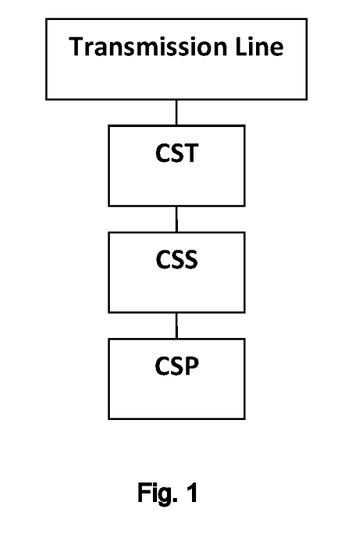
FIG. 1: Schematic representation of an embodiment of the disclosed electric vehicle charging station for connecting to a span of a high or extra high voltage transmission line.

The electric vehicle charging stations CSi, being i the charging station number, are installed in the charging station park, radially distributed by feeders. The charging stations CSi are power supplied by the AC voltage provided in each feeder. The CSi technology, being dependent on the CSi manufacture, do not affect the high power electric vehicle charging station system. The CSi input voltage tolerance is preferably, at least, 400 V+/−15%. Remote access to the CSi is possible through Ethernet communication that is provided by the CSS.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. An electric vehicle charging station for connecting to a span of a high or extra high voltage transmission line, comprising:
   a charging station tap directly connected to the span of the transmission line;
   a charging station substation fed from said tap comprising one or more power voltage transformers arranged to transform the high or extra high voltage to a low voltage for feeding electric vehicle chargers; and
   one or more electric vehicle chargers fed from said substation,
   wherein the one or more power voltage transformers is arranged to supply low voltage receiving power directly from the high voltage transmission line, bypassing a medium voltage network distribution,
   wherein medium voltage of the medium voltage network distribution is at 1 kV to 69 kV, wherein the low voltage is below the medium voltage and wherein the high or extra-high voltage is above the medium voltage.

2. The electric vehicle charging station according to claim 1, wherein the one or more power voltage transformers are station service voltage transformers, auxiliary service voltage transformers, or power VTs.

3. The electric vehicle charging station according to claim 1, wherein said power voltage transformers comprise a three-phase star-delta power voltage transformer or a three-phase star-star power voltage transformer.

4. The electric vehicle charging station according to claim 1, wherein said power voltage transformers comprise a set of three one-phase power voltage transformers connected as star-delta or a set of three one-phase power voltage transformers connected as star-star.

5. The electric vehicle charging station according to claim 1, wherein said transmission line comprises one or more phases and said tap comprises, for each phase of the transmission line:
   an insulator that links a first and a second interrupted conductor points of an interrupted transmission line conductor;
   a drop conductor connected between the first interrupted conductor point and said substation;
   a shunt connector arranged to be connectable between the second interrupted conductor point and a point of the drop conductor, or between the first and second interrupted conductor points.

6. The electric vehicle charging station according to claim 5, wherein said tap is arranged such that, by overhead power line maintenance operation, the substation-connected drop conductor is switchable: from being connected with the first interrupted conductor point, to being connected with the second interrupted conductor point, and vice-versa.

7. The electric vehicle charging station according to claim 6, wherein said tap is arranged such that, by overhead power line maintenance operation, the shunt conductor is switchable: from being connected between the second interrupted conductor point and a point of the drop conductor, to being connected between the first and second interrupted conductor points, or to being disconnected and removed from said tap.

8. The electric vehicle charging station according to claim 1, wherein said transmission line comprises one or more phases and said tap comprises, for each phase of the transmission line:
   an insulator that links a first and a second interrupted conductor points of an interrupted transmission line conductor;
   a drop conductor connected between the first interrupted conductor point and said substation; and
   a shunt connector arranged such that, when connected, the interrupted parts of the transmission line conductor are connected between each other, and, when disconnected or removed, the interrupted parts of the transmission line conductor are disconnected between each other.

9. The electric vehicle charging station according to claim 1, comprising a line disconnect switch between the transmission line and the tap, for connecting and disconnecting the substation from the high or extra high voltage transmission line when required, independently of the transmission line being energized or not.

10. The electric vehicle charging station according to claim 1, comprising a motorized earthing switch for securely earthing the charging station when it is electrically disconnected from the transmission line.

11. The electric vehicle charging station according to claim 1, comprising a current transformer for measuring the fault current in case of short-circuit in the high or extra high voltage part of the charging station.

12. The electric vehicle charging station according to claim 1, comprising an optical link interruption device for mounting in a transmission line tower adjacent to the tap span of the transmission line, wherein said device comprises a data communication optical link for linking the charging station and both ends of an interrupted optical link embedded in an interrupted earth conductor of a transmission line.

13. The electric vehicle charging station according to claim 1, comprising protection equipment for protecting the charging station from electrical faults, protection equipment for protecting the transmission line from electrical faults of the charging station, and/or protection equipment for protecting the electric vehicle chargers from electrical faults.

14. A method of operating an electric vehicle charging station, comprising the steps of:
   feeding a substation from a tap directly connected to a span of the transmission line to feed one or more power voltage transformers for transforming the high or extra high voltage to a low voltage for feeding the electric vehicle charger or chargers; and
   feeding the one or more of electric vehicle chargers fed from said substation,
   wherein the one or more power voltage transformers is arranged to supply low voltage receiving power directly from the high voltage transmission line, bypassing a medium voltage network distribution, and
   wherein medium voltage of the medium voltage network distribution is at 1 kV to 69 kV, wherein the low voltage is below the medium voltage and wherein the high or extra-high voltage is above the medium voltage.

15. The method according to claim 14, further comprising the step of: closing or opening a line disconnect switch between the transmission line and the substation for respectively connecting or disconnecting the substation from the high or extra high voltage transmission line, independently of the transmission line being energized or not.

16. The method according to claim 14, wherein the tap feeding the substation transforms the high or extra high voltage transmission line from a voltage of 72.5 kV to at least 400 kV.

17. The electric vehicle charging station according to claim 1, wherein the high or extra high voltage transmission line has a voltage of 72.5 kV to at least 400 kV.

* * * * *